(12) United States Patent
Noguero et al.

(10) Patent No.: US 10,346,450 B2
(45) Date of Patent: Jul. 9, 2019

(54) AUTOMATIC DATACENTER STATE SUMMARIZATION

(71) Applicant: CA, INC., New York, NY (US)

(72) Inventors: David Solans Noguero, Barcelona (ES); Jaume Ferrarons Llagostera, Barcelona (ES); Alberto Huelamo Segura, Barcelona (ES); Victor Muntes Mulero, Barcelona (ES); David Sanchez Charles, Barcelona (ES); Marc Sole Simo, Barcelona (ES)

(73) Assignee: CA, INC., New York, NY (US)

( * ) Notice: Subject to any disclaimer, the term of this patent is extended or adjusted under 35 U.S.C. 154(b) by 226 days.

(21) Appl. No.: 15/392,577

(22) Filed: Dec. 28, 2016

(65) Prior Publication Data
US 2018/0173687 A1     Jun. 21, 2018

(30) Foreign Application Priority Data
Dec. 21, 2016  (ES) .................................. 201631644

(51) Int. Cl.
*G06F 16/00* (2019.01)
*G06F 16/33* (2019.01)
(Continued)

(52) U.S. Cl.
CPC ........ *G06F 16/334* (2019.01); *G06F 16/9024* (2019.01); *H04L 41/147* (2013.01); *H04L 43/0817* (2013.01)

(58) Field of Classification Search
CPC ......... G06F 17/30675; G06F 17/30628; G06F 17/30958; G06F 17/30604; G06F 16/334;
(Continued)

(56) References Cited

U.S. PATENT DOCUMENTS 9,231,833 B1 * 1/2016 Bandopadhyay ....... H04L 41/12
                                                            709/221
9,383,970 B2   7/2016 Joy et al.
(Continued)

OTHER PUBLICATIONS

Rogers, David, and Mathew Hahn. "Extended-connectivity fingerprints." Journal of chemical information and modeling 50.5 (2010): 742-754.
(Continued)

*Primary Examiner* — Anh Ly
(74) *Attorney, Agent, or Firm* — Shook, Hardy & Bacon L.L.P.

(57) ABSTRACT

In a datacenter setting, annotations or descriptions of relevant parts or subgraphs corresponding to components in the datacenter are predicted. Given a set of training data (library of subgraphs seen in the past labeled with a textual description explaining why were they considered relevant enough to be placed in the historical database), the recurrent neural network (RNN) learns how to combine the different textual annotations coming from each relevant region into a single annotation that describes the whole system. Accordingly, given a set of input or test data (datacenter state modeled a context graph that is not annotated), the system determines which regions of the input graph are more relevant, and for each of these regions, the RNN predicts an annotation even in a previously unseen or different datacenter infrastructure.

20 Claims, 6 Drawing Sheets

(51) Int. Cl.
  *G06F 16/901* (2019.01)
  *H04L 12/24* (2006.01)
  *H04L 12/26* (2006.01)
(58) Field of Classification Search
  CPC .... G06F 16/9024; G06F 16/33; G06F 16/901; G06F 17/30707; G06F 17/30377; G06F 17/3053; G06F 17/30; G06F 17/30371; H04L 43/08; H04L 67/10; H04L 67/02; H04L 41/147; H04L 43/0817; H04L 12/24; H04L 12/26; G06N 99/005; G06N 5/022; G06N 5/047; G06N 3/08; G06N 3/04; G06N 7/005; G06Q 20/0658; G06G 16/00
  See application file for complete search history.

(56) References Cited

U.S. PATENT DOCUMENTS

| | | | |
|---|---|---|---|
| 9,762,450 B2 | 9/2017 | Xie et al. | |
| 9,817,805 B1 | 11/2017 | Markman et al. | |
| 2005/0198244 A1* | 9/2005 | Eilam | G06F 9/5061 709/223 |
| 2010/0121972 A1 | 5/2010 | Samuels et al. | |
| 2012/0137367 A1* | 5/2012 | Dupont | G06F 21/00 726/25 |
| 2012/0151026 A1* | 6/2012 | Chen | H04L 12/6418 709/223 |
| 2013/0031454 A1 | 1/2013 | Griffiths et al. | |
| 2014/0068032 A1* | 3/2014 | Kannan | H04L 12/4641 709/221 |
| 2014/0164352 A1* | 6/2014 | Denninghoff | H03H 9/02622 707/711 |
| 2014/0282586 A1 | 9/2014 | Shear et al. | |
| 2016/0110434 A1* | 4/2016 | Kakaraddi | G06F 17/30958 707/602 |
| 2016/0359872 A1* | 12/2016 | Yadav | H04L 43/04 709/223 |
| 2017/0322241 A1 | 11/2017 | Tang et al. | |
| 2018/0284743 A1 | 10/2018 | Cella et al. | |
| 2018/0284745 A1 | 10/2018 | Cella et al. | |

OTHER PUBLICATIONS

Duvenaud, David K., et al. "Convolutional networks on graphs for learning molecular fingerprints." Advances in Neural Information Processing Systems. 2015.

Xu, Kelvin, et al. "Show, attend and tell: Neural image caption generation with visual attention." arXiv preprint arXiv:1502.03044 2.3 (2015): 5.

Symmetric difference Wiki Page: https://www.wikiwand.com/en/Symmetric_difference.

Yll Haxhimusa. The Structurally Optimal Dual Graph Pyramid and its Application in Image Partitioning. Vienna University of Technology, Faculty of Informatics, Institute of Computer Aided Automation, Pattern Recognition and Image Processing Group. PhD Thesis, Chapter 2, 2006 (c) http://www.prip.tuwien.ac.at/twist/docs/graph_theory_basic_notions.pdf.

Learning to rank Wiki Page: https://www.wikiwand.com/en/Learning_to_rank.

Debnath, Sandip, "Automatic Text-based Explanation of Events," A Thesis in Computer Science and Engineering, Dec. 2005, 200 pages. https://etda.libraries.psu.edu/files/final_submissions/6051.

Portet, Francois et al., "Automatic Generation of Textual Summaries from Neonatal Intensive Care Data," 46 pages. http://homepages.abdn.ac.uk/e.reiter/pages/papers/aij-bt45.pdf (2015).

Wang, Nan et al., "An Anomaly Detection Algorithm Based on Lossless Compression," 2012 IEEE Seventh International Conference on Networking, Architecture, and Storage, 8 pages. http://ieeexplore.ieee.org/abstract/document/6310873/.

Karpathy, Andrej et al., "Deep Visual-Semantic Alignments for Generating Image Descriptions," 17 pages. http://cs.stanford.edu/people/karpathy/cvpr2015.pdf.

Fei, Hongliang Fei et al., "Structure feature selection for graph classification," CIKM'08, Oct. 26-30, 2008, Napa Valley, California, USA. http://ittc.ku.edu/~jhuan/papers/cikm08_fei.pdf.

Frequent subgraph mining, 75 pages. https://www.csc.ncsu.edu/faculty/samatova/practical-graph-mining-with-R/slides/pdf/Frequent_Subgraph_Mining.pdf.

Huan, Jun et al., "Efficient Mining of Frequent Subgraph in the Presence of Isomorphism," 12 pages. https://www.ittc.ku.edu/~jhuan/papers/03-021.pdf.

Bodik, Peter, et al. "Fingerprinting the datacenter: automated classification of performance crises." Proceedings of the 5th European conference on Computer systems. ACM, 2010.

Non-Final Office Action dated Sep. 10, 2018 in U.S. Appl. No. 15/392,585, 8 pages.

Non-Final Office Action dated Nov. 16, 2018 in U.S. Appl. No. 15/392,591, 21 pages.

* cited by examiner

| node | A | B | C | D | E |
|---|---|---|---|---|---|
| 210 ‒ It. 0 | H(1) | H(3) | H(2) | H(1) | H(1) |
| 220 ‒ It. 1 | H(H(1)H(3)) | H(H(3)H(1)H(1)H(2)) | H(H(2)H(1)H(3)) | H(H(1)H(2)) | H(H(1)H(3)) |

| | #N, it. 0 | #N, it. 1 | CPU, it. 0 | CPU, it. 1 |
|---|---|---|---|---|
| Node A | H(1) | H(H(1)H(3)) | H(40%) | H(H(40%)H(60%)) |
| | 310 | 312 | 320 | 322 |

AUTOMATIC DATACENTER STATE SUMMARIZATION

RELATED APPLICATION

This application claims priority to Spanish Application No. P 201631644, filed Dec. 21, 2016.

BACKGROUND

The growing complexity of large infrastructures, such as data centers, frequently hinders the understanding of the system behavior. System administrators frequently analyze metrics extracted from components of the system, relationships between components of the system, as well as the overall system itself.

While data centers have a wide range of sizes from hundreds to thousands of components, it is common to store up to tens or even hundreds different metrics at each timestamp from each component. Depending on the selected period for particular metrics to be read, which is typically a compromise between having the information updated enough and the required resources for the reading, processing, and storing the size of the data to be managed increases exponentially over time. Building management tools that can effectively deal with these volumes of data becomes challenging as the systems grow in complexity. For example, not only is there a need of increased processing power for analyzing the amount of data in a feasible amount of time, but also a need for visualizing a growing volume of data in a limited space and time as system administrators need to react as fast as possible to any anomaly in the system.

Given the sheer size of these infrastructures and the number of metrics to sort through, the challenge of summarizing all this information in a readily understandable description is not practical from a time or resource perspective.

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

Embodiments of the present disclosure relate to extracting a summary for the status of a datacenter. More particularly, the status is automatically summarized into a description explaining what set of properties are more significant for the status such that high-level descriptions and summaries are provided. Given a snapshot of the datacenter infrastructure, that corresponds to the list of the different metrics and statistics gathered from the system, at a certain timestamp, past or historical information is used to determine what regions or parts of the system should be considered to better understand the behavior of system as a whole. Accordingly, a high-level summary of this behavior is provided.

BRIEF DESCRIPTION OF THE DRAWINGS

The present invention is described in detail below with reference to the attached drawing figures, wherein.

DETAILED DESCRIPTION

Figure 1:
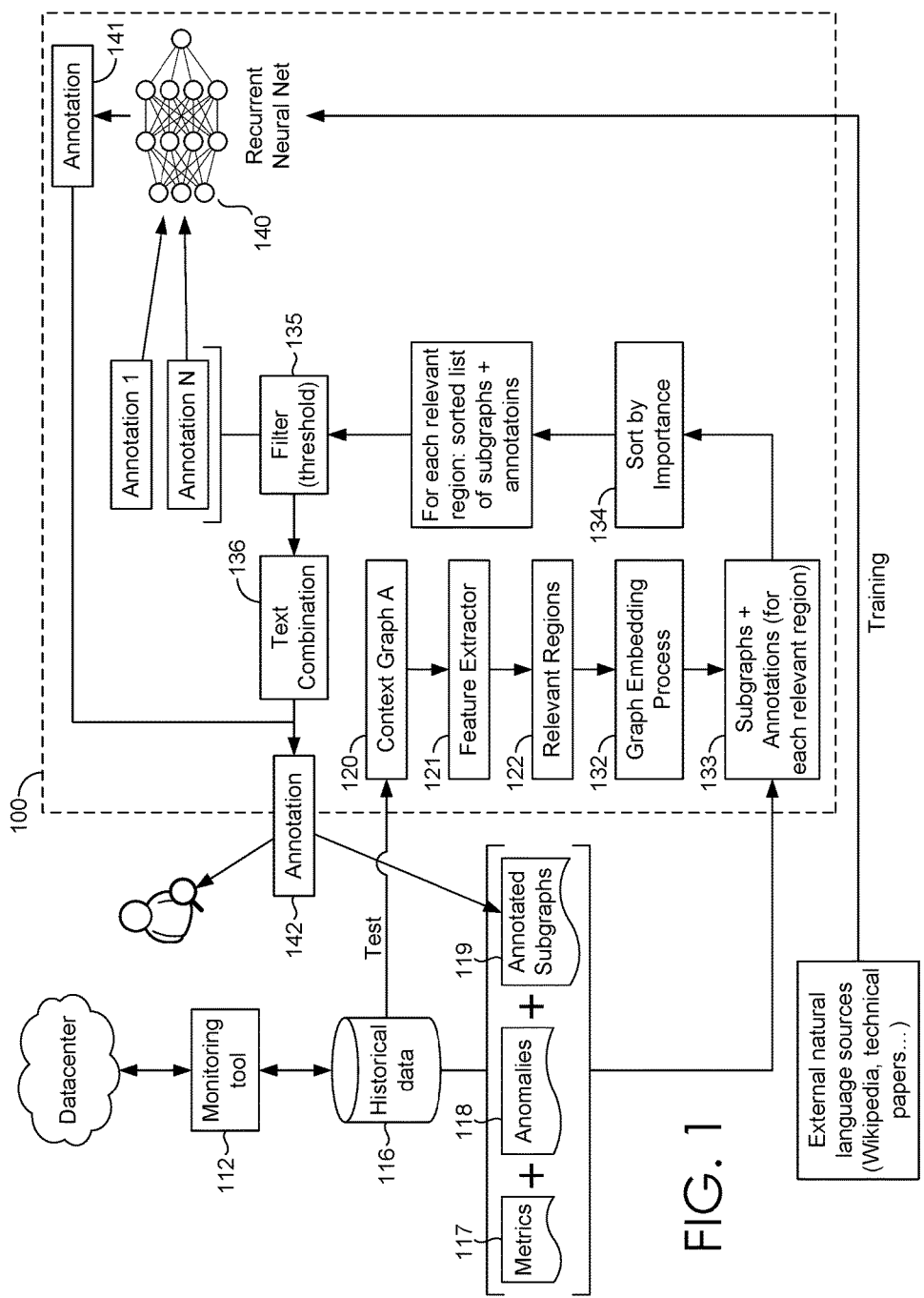
FIG. 1 is a block diagram showing an annotation system that provides annotations to summarize the status of a datacenter, in accordance with an embodiment of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. For example, although this disclosure refers to generating context graphs that represent datacenters in illustrative examples, aspects of this disclosure can be applied to generating context graphs that represent relationships between components in a local hardware or software system, such as a storage system or distributed software application. Moreover, although the terms "step" and/or "block" may be used herein to connote different elements of methods employed, the terms should not be interpreted as implying any particular order among or between various steps herein disclosed unless and except when the order of individual steps is explicitly described. As used herein, the singular forms "a," "an," and "the" are intended to include the plural forms as well, unless the context clearly indicates otherwise.

The term "component" as used in the description below encompasses both hardware and software resources. The term component may refer to a physical device such as a computer, server, router, etc., a virtualized device such as a virtual machine or virtualized network function, or software such as an application, a process of an application, database management system, etc. A component may include other components. For example, a server component may include a web service component which includes a web application component.

The term "context graph" refers to a data structure that depicts connections or relationships between components. A context graph consists of nodes (vertices, points) and edges (arcs, lines) that connect them. A node represents a component, and an edge represents a relationship between the corresponding components. Nodes and edges may be labeled or enriched with data or properties. For example, a node may include an identifier for a component, and an edge may be labeled to represent different types of relationships, such as a hierarchical relationship or a cause-and-effect type relationship. In embodiments where nodes and edges are enriched with data, nodes and edges may be indicated with data structures that allow for the additional information, such as JavaScript Object Notation ("JSON") objects, extensible markup language ("XML") files, etc. Context graphs may also be referred to in related literature as a triage map, relationship diagram/chart, causality graph, etc.

The term "subgraph" refers to a portion of a context graph. Subgraphs may be stored in a historical database as training data and may be aggregated to facilitate data imputation for missing data in a context graph. Subgraphs may additionally be utilized to diagnose particular problems in a datacenter. For example, if a particular problem occurs, the subgraphs that generate a particular hash for the particular problem may be provided to help identify a source of the problem in the datacenter.

The term "relevant region" refers to a subgraph that is identified as relevant during the feature extraction process. The subgraph is relevant because there is evidence (e.g., relevance conditions) that suggests or supports that a set of details present at a relevant region is important to provide an understanding of the system.

Properties of a subgraph or context graph may be described by a "hash", a "vector representation", or a "graph embedding". A hash may be determined based on a particular property or properties of a node. The properties may be metrics of the node or aggregated neighbor related information. The aggregated neighbor related information may include a number of neighbors of the node, an absolute number of neighbors with some condition, a relative number of neighbors with some condition, a sum/maximum/minimum/average of some node properties, etc. For clarity, a "neighbor" corresponds to a node that is directly connected to the subject node by an edge. The edge may correspond to relationships among hardware and software components between the nodes.

The hash may additionally have a predetermined number of iterations which may be based on a diameter of the subgraph or context graph, desired input size, etc. For example, at iteration 0, the hash includes a hash of the particular node. At iteration 1, the hash includes a hash of the hash of the particular node and the hash of neighbor nodes. At iteration 2, the hash includes a hash of the hash of the particular node, the hash of the neighbor nodes, and the hash of the neighbors of the neighbor nodes. In this way the hash provides a fingerprint or identifying characteristics of the subgraph or context graph corresponding to properties of nodes of the subgraph or context graph that can be utilized to identify similar subgraphs or context graphs.

A vector representation may correspond to the hash itself, or a string of hashes being considered (e.g., hashes of multiple properties or for multiple nodes). In embodiments, a vector representation corresponds to a subgraph or context graph as it evolves over time. For example, as a particular property or node changes over time, the vector representation represents the hash of the particular node as it changes over time which may help diagnose a particular a root cause of relevance condition, predict a future state of the datacenter (e.g., a particular property or particular node), identify missing properties, summarize or annotate a state of the datacenter, compare states of the datacenter, and the like.

The description below refers to a "relevance condition" to describe a message or notification of an unexpected occurrence in a system or in a component of the system at a point in time. A relevance condition often relates to resource consumption and/or state of a system or system component. As examples, a relevance condition may be that a file was added to a file system, that a number of users of an application exceeds a threshold number of users, that an amount of available memory falls below a memory amount threshold, or that a component stopped responding or failed. A relevance condition can reference or include data or properties about the relevance condition and is communicated to by an agent or probe to a component/agent/process that processes relevance conditions. The data or properties about the relevance condition may be utilized to build a context graph or a subgraph.

A "annotation" as used herein refers to a textual description that describes, at a high-level, a relevance condition or a status of the datacenter. For example, an annotation may include "database cluster is almost full", "one server crashed and frontend failover is not working properly", "hard disk from backend server died and was replaced", and the like.

As noted in the background, the growing complexity of large infrastructures, such as data centers, frequently hinders the understanding of the system behavior. System administrators frequently analyze metrics extracted from components of the system, relationships between components of the system, as well as the overall system itself.

While data centers have a wide range of sizes from hundreds to thousands of components, it is common to store up to ten different metrics at each timestamp from each component. Depending on the selected period for particular metrics to be read, which is typically a compromise between having the information updated enough and the required resources for the reading, processing, and storing the size of the data to be managed increases exponentially over time. Building management tools that can effectively deal with these volumes of data becomes challenging as the systems grow in complexity. For example, not only is there a need of increased processing power for analyzing the amount of data in a feasible amount of time, but also a need for visualizing a growing volume of data in a limited space and time as system administrators need to react as fast as possible to any anomaly in the system.

Given the sheer size of these infrastructures and the number of metrics to sort through, the challenge of summarizing all this information in a readily understandable description is not practical from a time or resource perspective.

Embodiments of the present disclosure relate to predicting a summary for the status of a datacenter. More particularly, the status is automatically summarized into a textual description based on a set of relevant regions that is considered more meaningful during the feature extraction process and explains which set of subgraphs are more significant for the status such that their details are explained in the high-level descriptions and summaries. To do so, a graph embedding process is used in order to model the regions as a plurality of hashes. Accordingly, given a set of input or test data (data that is not labeled with summaries), a recurrent neural network (RNN) is able to combine text inputs into a human-like language summarization for the status of the datacenter even in a previously unseen or different datacenter infrastructure.

The set of extracted hashes is compared with the graph embeddings extracted from the historical database by a similarity distance processing. This results in a list of historical subgraphs that are closely related to each of the relevant regions identified in the test data.

In practice, data is received periodically from the different components of the datacenter. Upon detecting an anomaly, the data is more likely to be part of a relevant region to be processed by the annotation system. This data contains the anomalies and metrics of components of the datacenter. The annotation system is also connected to a historical database. Historical data in the historical database contains the anomalies and metrics of components of the datacenter as well as annotation that describe the details that made a certain subgraph observed in the past be relevant enough to be included in the historical database.

Using the historical data, the RNN is trained with some iterative training method, for example, batch or stochastic gradient descent. To obtain a classifier that is reusable as much as possible across different datacenters (so that a classifier trained in a particular datacenter can be leveraged across multiple datacenters), the input neurons of the data, as explained in more detail below, contain a certain number of subgraphs that are similar to a relevant region. In this way, evolution of the datacenter can be a factor in both training and testing for the RNN. In some embodiments, a software as a service (SaaS) enables sharing of historical data or anonymized information pertaining to the structure of the RNN itself.

The data may be received in the form a context graph. The context graph comprises nodes corresponding to components of the datacenter and edges corresponding to relationships between the nodes. A given node that is connected by an edge to another node is a neighbor of that node. Each node may include data or properties (e.g., metrics, anomalies, annotations) that can be encoded using hashing techniques (e.g., a circular hashing process). The hash may additionally have a predetermined number of iterations which may be based on a diameter of the subgraph or context graph, desired input size, etc. A vector representation may correspond to the hash itself, or a string of hashes being considered (e.g., hashes of multiple properties or for multiple nodes).

In embodiments, each state of a given node represents not just a set of anomalies or metrics, but includes anomalies or metrics of its neighbors. This enables relationships between nodes to be considered by the classifier, which may be essential in identifying more accurate annotations for a particular anomaly. Alternatively, encodings such as assuming a model in which at most k neighbors per node are considered (which may require a selection of the most important k neighbors if the node has more than k neighbors or dummy neutral input values when the node has less than k neighbors). Additional metrics that can be considered by the classifier and scale regardless of the how many neighbors a node has may include number of neighbors, percentage of neighbors with a particular condition, average of some continuous metrics of the neighbors (useful for instance to model demand on a database node if we consider the number of SQL queries as the continuous metric).

Thus, given an unannotated node in a context graph, the CNN may identify subgraphs from a library of subgraphs that, when aggregated, are similar to the context graph. By identifying annotations corresponding to the aggregated subgraphs, and combining the annotations in accordance with an importance, the node can be annotated with the combined annotations. In this way, the previously unannotated node can be automatically annotated to describe an anomalous condition of the node with a textual description.

Accordingly, one embodiment of the present disclosure is directed to a method that facilitates predicting an annotation for a subgraph of a context graph corresponding to a relevance condition in a datacenter. The method comprises receiving a context graph indicating a plurality of relationships among a plurality of nodes corresponding to components of a datacenter. Each node comprises properties corresponding to a particular component of the datacenter. The method also comprises, for a subgraph of the context graph corresponding to a relevance condition and lacking an annotation describing the relevance condition, determining a plurality of context hashes based on selected properties of the subgraph. The method further comprises comparing the plurality of context hashes to a plurality of subgraph hashes derived from a library of subgraphs to determine a set of subgraph hashes that are similar to the plurality of context hashes derived for each relevant region. The method also comprises identifying annotations corresponding to the set of subgraph hashes. The method further comprises combining the annotations in accordance with an importance into an annotation for each relevant region. The method also comprises annotating the context graph with the combined annotations. The combined annotations describe the datacenter as a whole with a textual description.

In another embodiment of the present disclosure is directed to a method that facilitates training a classifier to predict an annotation of a relevance condition detected in a datacenter. The method comprises receiving historical metrics from a plurality of historical nodes for relevance conditions seen by historical datacenters. The method also comprises aggregating the historical metrics into historical vector representations for the plurality of historical nodes in the historical datacenters. The historical vector representations include information derived from the historical metrics of neighbors of the historical nodes and having annotations describing the relevance conditions seen by historical datacenters. The method further comprises training a classifier with the historical vector representations and annotations to predict an annotation for a datacenter depicted by a context graph. The context graph indicates a plurality of relationships among a plurality of nodes corresponding to components of the datacenter. The context graph comprise a subgraph identified as a relevant region corresponding to a relevance condition not having an annotation describing the relevance condition with a textual description.

In yet another embodiment, the present disclosure is directed to a computerized system that utilizes a classifier to annotate a context graph by combining annotations generated from identified relevant regions corresponding to a relevance condition in a datacenter, The system includes a processor and a non-transitory computer storage medium storing computer-useable instructions that, when used by the processor, cause the processor to receive a context graph indicating a plurality of relationships among a plurality of nodes corresponding to components of a datacenter. Each node comprises properties corresponding to a particular component of the datacenter. For a subgraph in the context graph corresponding to a relevance condition, the subgraph being a relevance region and lacking an annotation describing the relevance condition, a plurality of context hashes is determined based on selected properties of the nodes that are part of the subgraph. The plurality of context hashes is compared to a plurality of subgraph hashes derived from a library of subgraphs to determine a set of subgraph hashes that are similar to the plurality of context hashes. Annotations corresponding to the set of subgraph hashes are identified and the annotations are combined in accordance with an importance. The relevant region is annotated with the combined annotations describing the relevance condition with a textual description.

Referring now to FIG. 1, a block diagram is provided that illustrates an annotation system 100 that annotates a set of relevant regions of a context graph corresponding to a set of relevance conditions detected in a datacenter, in accordance with an embodiment of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The annotation system 100 may be implemented via any type of computing device, such as computing device 700 described below with reference to FIG. 7, for example. In various embodiments, the annotation system 100 may be implemented via a single device or multiple devices cooperating in a distributed environment.

The annotation system 100 generally operates to provide an annotation for any relevant region detected in a datacenter and combine each annotation to generate one final annotation describing the system as a whole. As shown in FIG. 1, the annotation system 100 communicates with, among other components not shown, datacenter 110, monitoring tool 112, feature extractor 121, and database 116. It should be understood that the annotation system 100 shown in FIG. 1 is an example of one suitable computing system architecture. Each of the components shown in FIG. 1 may be implemented via any type of computing device, such as computing device 700 described with reference to FIG. 7, for example.

The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of datacenters, monitoring tools, feature extractors, or databases may be employed by the annotation system 100 within the scope of the present disclosure. Each may comprise a single device or multiple devices cooperating in a distributed environment. For instance, the annotation system 100 may be provided via multiple devices arranged in a distributed environment that collectively provide the functionality described herein. In some embodiments, some or all functionality provided by monitoring tool 112, feature extractor 121, and/or database 116 may be provided by annotation system 100. Additionally, other components not shown may also be included within the network environment.

As shown in FIG. 1, the annotation system 100 communicates with a database 116. While only a single database 116 is shown in FIG. 1, it should be understood that the annotation system 100 may communicate with any number of databases. Each datacenter 110 may utilize multiple databases corresponding to different entities, affiliates, business units, systems, etc., of the organization. Each database 116 may store metrics 117 of various components in the datacenter that are received from monitoring tool 112. Each database 116 may additionally store anomalies 118 detected by an external anomaly detector. Additionally, database 116 includes a library of annotated subgraphs observed in the past 119. In various embodiments, the annotation is manually provided by a user (e.g., annotations from past observed subgraphs 119), automatically provided by the annotation system 100 (e.g., annotation 142), or a combination thereof.

The annotation system 100 initially receives training data from database 116. The training data comprises metrics 117 modeled into a datacenter state representation in the form of a context graph 120. The training data additionally comprises a library of annotations from past observed subgraphs 119 that have been manually provided by a user or annotations 142 that have been provided by the annotation system 100 and later validated by a user. In order to train the RNN that will be used to combine a set of textual annotations into a single annotation describing the system as a whole, technical language sources may be utilized. Texts extracted from technical publications, scientific magazines, or open knowledge sites such as WIKIPEDIA may be used, in various embodiments, to train the RNN. Annotation system 100 receives a state of a datacenter, that corresponds to a snapshot representation of the system at a certain timestamp, as illustrated in FIG. 1 by state A 120. The state can be decomposed into a set of relevant regions 121 by a feature extractor.

After receiving the training data from database 116 corresponding to a single state of the datacenter, the data is utilized to build a context graph. As described above, a context graph refers to a data structure that depicts connections or relationships between components of the datacenter. The context graph consists of nodes (vertices, points) and edges (arcs, lines) that connect them. Each node represents a component and each edge represents a relationship between the corresponding components. The nodes and edges may be labeled or enriched with the metrics, anomalies, and/or other information.

As illustrated, once the RNN 140 has been trained, the test data, for example state A 120, is decomposed into a plurality of relevant regions 122 by the feature extraction process 121. Each of the relevant regions 122 is communicated to the graph embedding process 132 so the relevant regions 122 can be represented by a plurality of hashes. The hashes are based on selected properties of the node and selected properties of neighbors of the node. In some embodiments, padding is utilized to encode a particular property of a particular node when the node has less than K neighbors. Alternatively, if the particular node has more than K neighbors, the neighbors may be sorted by relevance for the particular property and the top K neighbors are selected.

Figure 2:
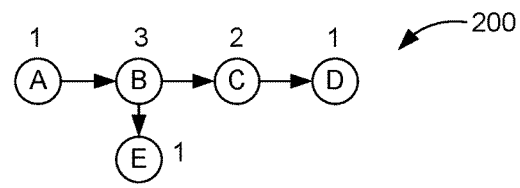
FIG. 2 is an exemplary hash algorithm for context graphs using a single property from its nodes, in accordance with an embodiment of the present disclosure.

With reference to FIG. 2, an exemplary hash algorithm is illustrated for context graph nodes using a single property, in accordance with an embodiment of the present disclosure. The hash may be determined by annotation system 100 of FIG. 1 utilizing the hash algorithm as shown. In this example, a hash may be determined for each node of the context graph or subgraph 200 based on selected properties. The properties may include metrics of the node and/or aggregated neighbor related information. The aggregated neighbor related information may include a number of neighbors, an absolute number of neighbors with some conditions, a relative number of neighbors with some condition, a sum/maximum/minimum/average of some node properties, etc. A number of iterations 210, 220 may also be utilized to determine the hashes. The number of iterations may be based on a diameter of the context graph or subgraph, a desired input size, etc. The information associated to a single node are the values in its column in the table for each iteration 210, 220.

For example, using a number of neighbors as the selected property, at iteration 0, the hash of node A is represented by H(1) because its only neighbor is node B. Under the same properties, the hash of nodes B, C, D, E are represented by H(3), H(2), H(1), and H(1) because nodes B, C, D, E have 3, 2, 1, 1 neighbors, respectively.

In the same example, and still referring to FIG. 2, at iteration 1, the hash of node A considers a hash of (the hash of node A and the hash of node B) which can be represented by H(H(1)H(3)). Under the same properties, the hash of nodes B, C, D, E are represented by H(H(3)H(1)H(1)H(2)), H(H(2)H(1)H(3)), H(H(1)H(2)), and H(H(1)H(2)). As can be appreciated, this circular hashing process can be utilized for multiple iterations or depths of the context graph to provide a fingerprint or identifying characteristics of the context graph corresponding to the selected properties of nodes of the context graph which can be utilized to identify similar subgraphs or context graphs.

Figure 3:
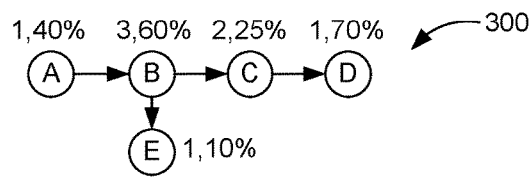
FIG. 3 is an exemplary hash algorithm for context graphs using multiple properties from its nodes, in accordance with embodiments of the present disclosure.

Turning now to FIG. 3, an exemplary hash algorithm for context graph nodes is illustrated using multiple properties, in accordance with an embodiment of the present disclosure. The hash may be determined by annotation system 100 of FIG. 1 utilizing the hash algorithm as shown. For example, using a number of neighbors as the selected property, at iteration 0, the hash of node A is represented by H(1) 310 because its only neighbor is node B. At iteration 1, the hash of node A considers a hash of (the hash of node A and the hash of node B) which can be represented by H(H(1)H(3)) 312. Similarly, using CPU as the selected property, at iteration 0, the hash of node A is represented by H(40%) 320. At iteration 1, the hash of node A considers a hash of (the hash of node A and the hash of node B) which can be represented by H(H(40)H(60)) 322.

Referring back to FIG. 1, resulting hashes from the embedding process 132 are compared with the ones calculated for the annotated subgraphs 119 received from database 116 to identify a set of subgraphs observed in the past that are similar enough to each of the processed relevant regions. The annotations 133 from the identified set of subgraphs observed in the past can be used for further processing.

After receiving the multiple past subgraphs and corresponding annotations, the data is sorted by importance criteria 134 in order to determine which results are similar and relevant enough (e.g., subgraph size metrics or subgraph frequency on database 116 may be used). Accordingly, the results are sorted by a sorting mechanism 135 that uses a threshold to discard results that are not relevant enough. The annotations of the filtered subgraphs may be directly combined by plain textual concatenation or other more advanced techniques based on the relevance of each annotation. In some embodiments, the list of filtered subgraphs may be fixed to a certain number of elements determined by the RNN 140 such as number of inputs (some padding might be required in case the length of the filtered subgraphs does not contain enough items). The list of filtered subgraphs may be fed into the RNN 140 in order to generate an annotation 141 for each of the relevant subregions 122. In embodiments, these annotations are combined into a single annotation 142 by the text combination engine 136.

In some embodiments, the annotations may include examples such as "database cluster is almost full", "one server crashed and frontend failover is not working properly", "hard disk from backend server died and was replaced" and the like.

In some embodiments, it is possible to obtain which types of configurations are associated to a particular annotation, thus creating "graph stereotypes" associated to particular problems (e.g., which graph stereotypes are related to the annotation "overload"). This information is valuable to provide human-understandable diagnosis explanations and can be used to feed a rule-based or graph-rule-based diagnostic system (i.e., a system that works with rules, but in which rules are specified using graph properties, such as reachability, centrality, etc.).

In some embodiments, RNN 140 may receive as an input a particular label or annotation. Sequences of hashes that correspond to the particular annotation are provided as output. This enables the training data to be scanned to identify which structures (e.g., context graphs or subgraphs) correspond to those hashes so that a particular problem may be diagnosed.

Figure 4:
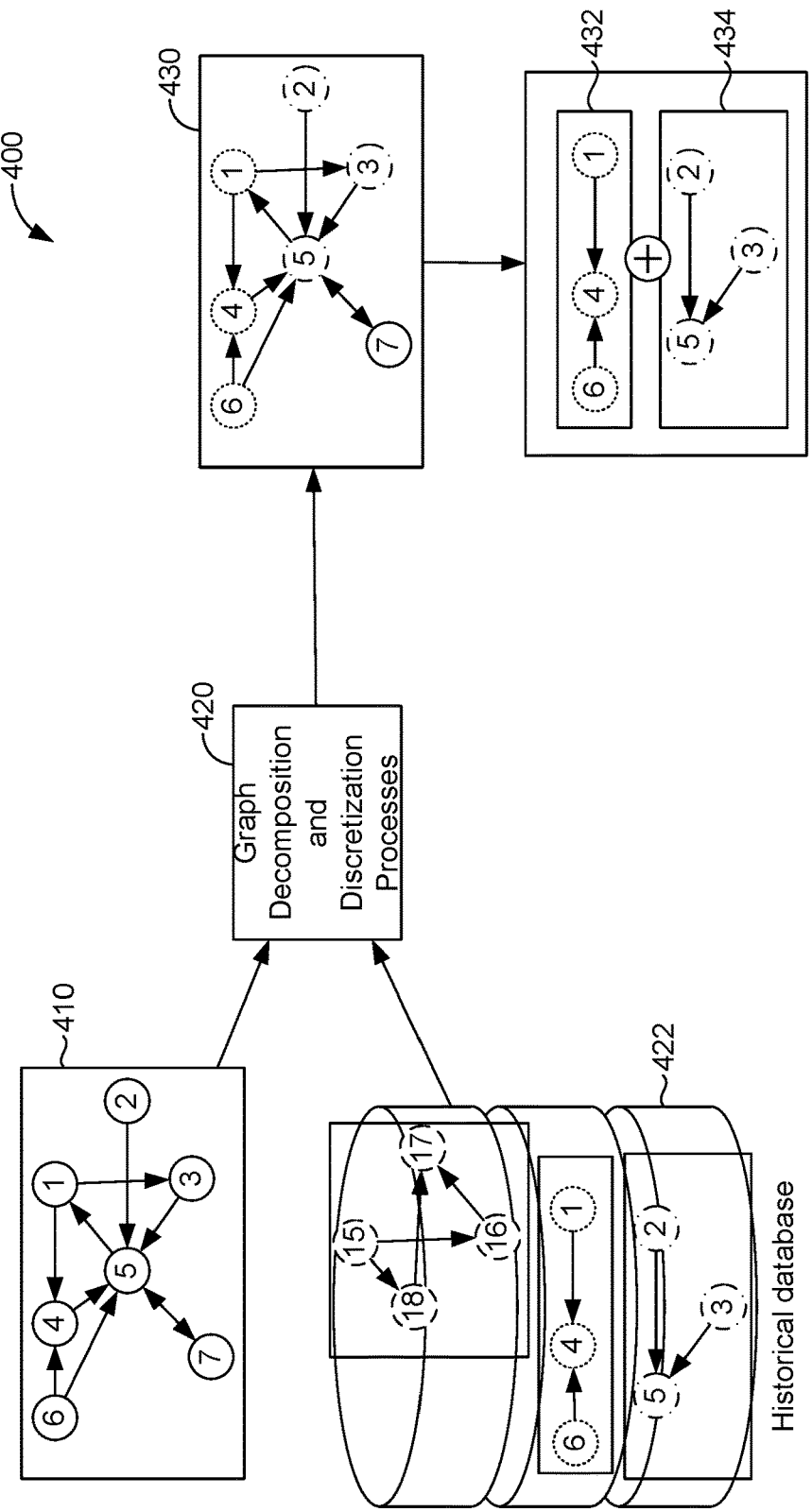
FIG. 4 illustrates a flow diagram of the graph decomposition and discretization processes, in accordance with embodiments of the present disclosure.

Referring now to FIG. 4, a flow diagram of the graph decomposition and discretization process 400 is illustrated, in accordance with embodiments of the present disclosure. For example, a context graph 410 that is received by annotation system has a particular structure. The context graph 410, may be compared to a library of subgraphs 422.

In embodiments, rather than generating a result from the complete overview of the system (i.e., the entire context graph), the identification of portions of the graph that have been already seen in the past facilitates the decomposition and discretization processes of the actual state. In this way, the context graph may be decomposed by graph decomposition and discretization processes 420 into a vector of small graphs present in the library of subgraphs that have already been annotated with a textual description. Each small graph can be treated as a feature and the context graph, when transformed into to a vector of features, can be compared to the subgraphs in the related feature space. As illustrated, the context graph 410 has been decomposed and matched, using graph decomposition and discretization processes 430, with two subgraphs 432, 434 that, when aggregated 430, are similar to the context graph 410.

Since taking into account the number of metrics that are extracted from each node may make it difficult to find a small graph that is exactly equal to a subgraph, similarity criteria can be used in the feature selection. For example, in order to find persisted candidates that are similar enough to a region of the actual graph, subgraph mining techniques, encoding datacenter states represented by a plurality of hashes (as described above), or RNNs may be utilized.

Figure 5:
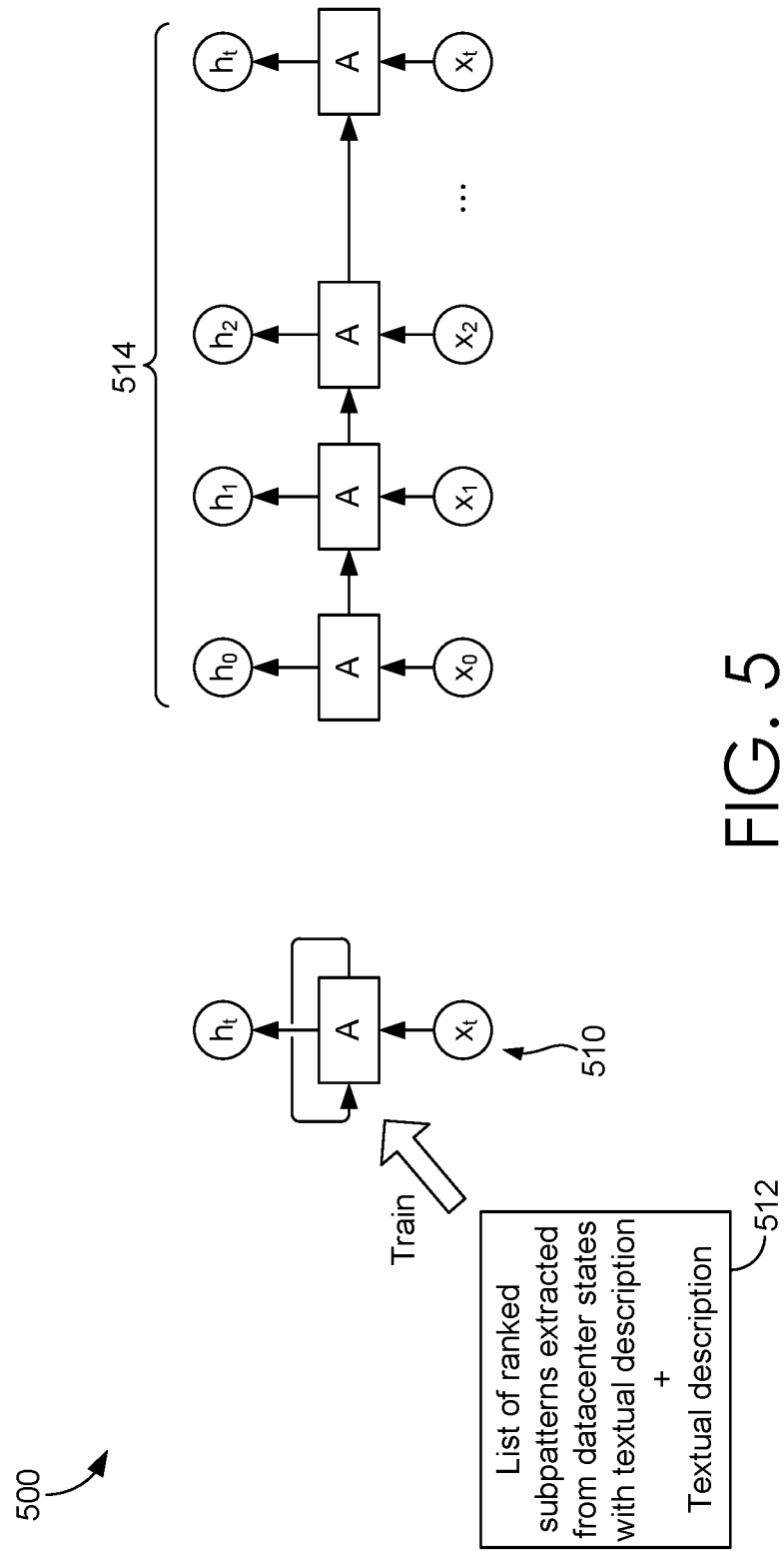
FIG. 5 illustrates an exemplary recurrent neural network that is utilized to generate an annotation as a combination of a set of N annotations describing the set of N identified regions, in accordance with embodiments of the present disclosure.

FIG. 5 illustrates an exemplary recurrent neural network (RNN) system 500 that is utilized to generate an annotation, in accordance with embodiments of the present disclosure. By using the subgraph annotations extracted from the graph decomposition and discretization processes described with respect to FIG. 4, the annotations describing the features in the subgraphs can be utilized by RNN 510 to annotate a particular relevance region of the context graph.

A ranking methodology is utilized to determine the most relevant resultant subgraphs and annotations so they will have more importance in the resulting annotation. The relevance may depend on the specific case and can vary depending on the specific needs of the system administrator who will use the annotation. To sort the feature vectors by relevance there are several methodologies that can be used. For example, the relevance can be determined by graph size metrics, centrality of the extracted region (feature) in the system status, or frequency of the pattern in the historical data (i.e., from the library of subgraphs).

Once the feature vectors are sorted by relevance, an annotation composition function may be utilized. For example, concatenation of the annotation may be utilized. Advanced natural language processing techniques may be utilized to generate the annotation, such as by RNN 510. The resulting annotation 514 includes a description of the set of features that were found in the actual status and that may be affecting the performance of the system. Additionally, an identification of frequent behaviors may also be provided (i.e., properties of recurring subgraphs).

Figure 6:
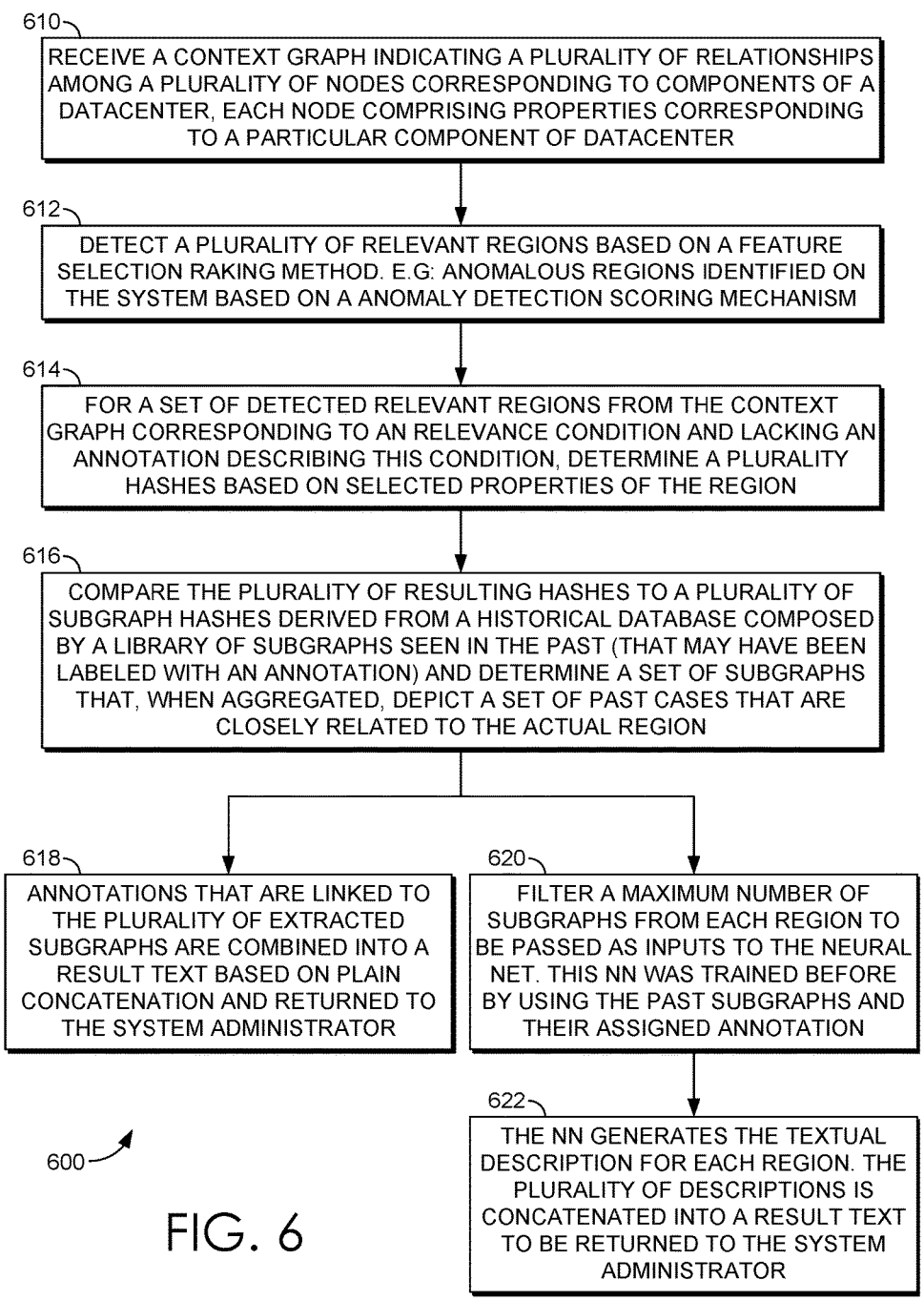
FIG. 6 is a flow diagram showing a method of training a classifier with an annotation corresponding to a sequence of historical datacenter states, in accordance with embodiments of the present disclosure.

Turning now to FIG. 6, a flow diagram is provided that illustrates a method 600 for training a classifier with an annotation corresponding to a sequence of historical datacenter states, in accordance with embodiments of the present disclosure. For instance, the method 600 may be employed utilizing the annotation system 100 of FIG. 1. As shown at step 610, a context graph is received. The context graph indicates a plurality of relationships among a plurality of nodes corresponding to components of a datacenter. Each node comprises properties corresponding to a particular component of the datacenter. In some embodiments, properties are received from a historical database to build the context graph. The properties may be received from a most recent timestamp to build the context graph.

A plurality of relevant regions is detected, at step 612. The plurality of relevant regions is based on a feature selection ranking method. For example, anomalous regions identified by the system based on an anomaly detection scoring mechanism. For a set of detected relevant regions from the context graph corresponding to a relevance condition and lacking an annotation describing this condition, a plurality of hashes is determined, at step 614, based on selected properties of the region.

At step 616, the plurality of hashes is compared to a plurality of subgraph hashes derived from a historical database comprising a library of subgraphs seen in the past (that may have been labeled with an annotation) to determine a set of subgraphs that, when aggregated, depict a set of past cases that are closely related to the actual region. In some embodiments, the set of subgraph hashes include annotations provided by a user that describe relevance conditions corresponding to each subgraph hash of the set.

In some embodiments, as shown at step 618, annotations that are linked to the plurality of extracted subgraphs are combined into a resulting annotation based on plain concatenation and is returned to a system administrator. In other embodiments, a maximum number of subgraphs from each region is filtered, at step 620, and passed as inputs to a neural network that is trained with historical subgraphs and corresponding labels. At step, 622, the neural network generates a textual description for each region and the plurality of descriptions are concatenated into a resulting annotation that is returned to the system administrator.

In some embodiments, the annotations are combined in accordance with an importance. The importance may be based on a ranking function. In various embodiments, the ranking function considers a centrality of the set of subgraph hashes to the relevance condition or a frequency of a pattern in the set of subgraph hashes. The set of relevant regions can be annotated with the combined annotations that describe the relevance conditions with a textual description.

In some embodiments, combining the annotations comprises concatenating the annotations. In other embodiments, combining the annotations comprises utilizing natural language processing techniques to generate the textual description. The combined annotations may further describe the property or the particular component that is causing the relevance condition.

Figure 7:
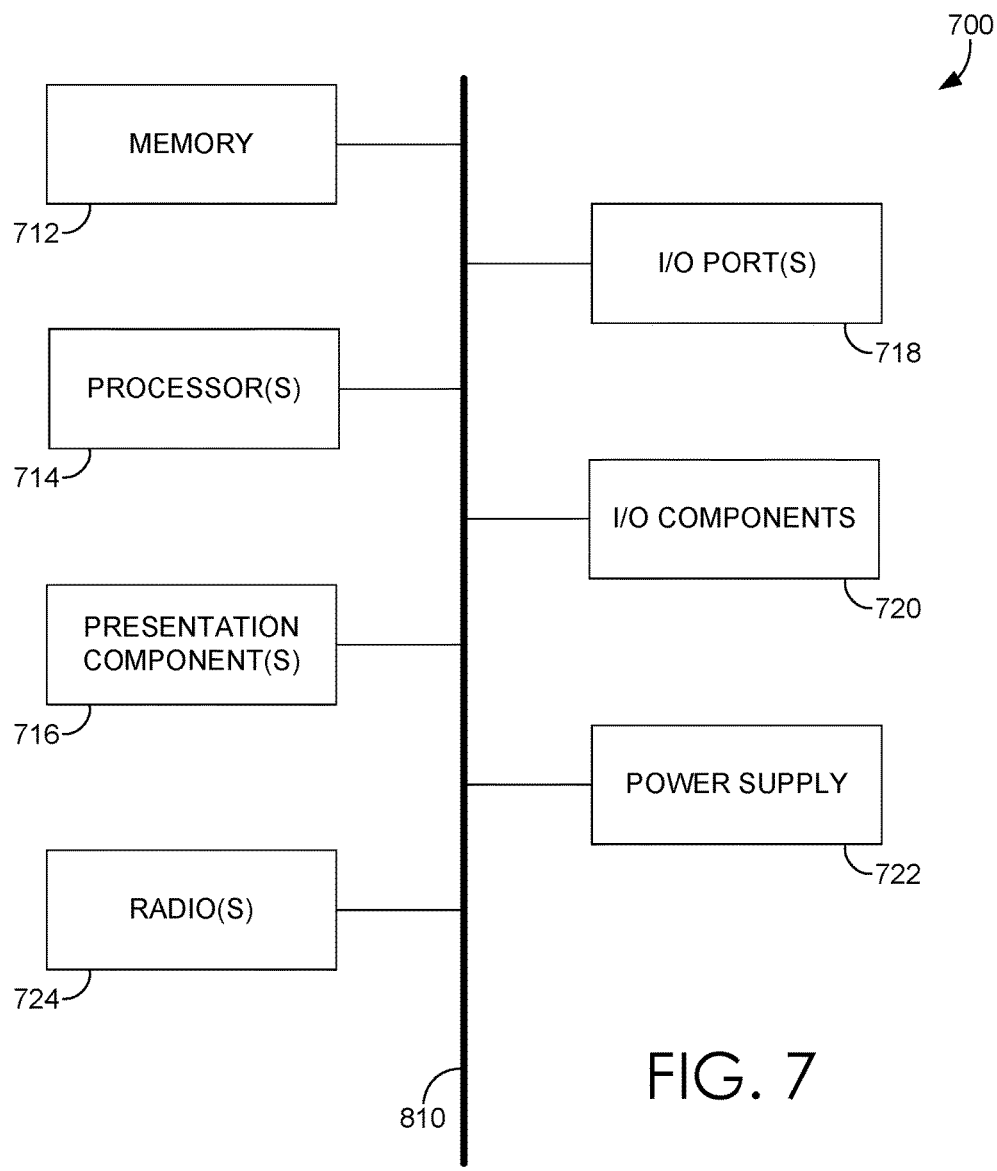
FIG. 7 is a block diagram of an exemplary computing environment suitable for use in implementing embodiments of the present disclosure.

Having described embodiments of the present disclosure, an exemplary operating environment in which embodiments of the present disclosure may be implemented is described below in order to provide a general context for various aspects of the present disclosure. Referring to FIG. 7 in particular, an exemplary operating environment for implementing embodiments of the present disclosure is shown and designated generally as computing device 700. Computing device 700 is but one example of a suitable computing environment and is not intended to suggest any limitation as to the scope of use or functionality of the inventive embodiments. Neither should the computing device 700 be interpreted as having any dependency or requirement relating to any one or combination of components illustrated.

The inventive embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The inventive embodiments may be practiced in a variety of system configurations, including handheld devices, consumer electronics, general-purpose computers, more specialty computing devices, etc. The inventive embodiments may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output (I/O) components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present disclosure provide for an objective approach for annotating a set of relevant regions of a context graph corresponding to a relevance condition detected in a datacenter and which descriptions, combined, describe the state of the datacenter at a certain timestamp. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method comprising:
    receiving a context graph indicating a plurality of relationships among a plurality of nodes corresponding to components of a datacenter, each node comprising properties corresponding to a particular component of the datacenter;
    identifying one or more subgraphs from the context graph, wherein each subgraph is a portion of the context graph that is determined to be a relevant region associated with the datacenter;
    for each subgraph identified as a relevant region in the context graph, determining whether each subgraph identified as a relevant region corresponds to a relevance condition and lacks an annotation describing the relevance condition;
    determining, for each subgraph identified as a relevant region, a plurality of context hashes based on selected properties, the context hashes generated by applying a hash function to each subgraph;
    comparing the plurality of context hashes to a plurality of subgraph hashes derived from a library of subgraphs to determine a set of subgraph hashes that are similar to the plurality of context hashes derived for each relevant region;
    identifying annotations for each subgraph identified as a relevant region by referencing corresponding subgraph hashes in the set of subgraph hashes;
    combining the annotations in accordance with an importance into an annotation for each relevant region; and
    annotating the context graph with the combined annotations, the combined annotations describing the datacenter as a whole with a textual description.

2. The method of claim 1, wherein the set of subgraph hashes include annotations provided by a user that describe relevance conditions corresponding to each subgraph hash of the set.

3. The media of claim 1, further comprising receiving properties from a historical database to build the context graph.

4. The method of claim 1, further comprising receiving properties from a most recent timestamp to build the context graph.

5. The method of claim 1, wherein the importance is based on a ranking function.

6. The method of claim 5, wherein the ranking function considers a centrality of the set of subgraph hashes to the relevance condition.

7. The method of claim 5, wherein the ranking function considers a frequency of a pattern in the set of subgraph hashes.

8. The method of claim 1, wherein combining the annotations comprises concatenating the annotations.

9. The method of claim 1, wherein combining the annotations comprises utilizing natural language processing techniques to generate the textual description.

10. The method of claim 1, wherein the combined annotations describes the property or the particular component that is causing the anomalous condition.

11. A method comprising:
    receiving historical metrics from a plurality of historical nodes for relevance conditions seen by historical datacenters;
    aggregating the historical metrics into historical vector representations for the plurality of historical nodes in the historical datacenter, the historical vector representations including information derived from the historical metrics of neighbors of the historical nodes and having annotations describing relevance conditions seen by the historical datacenters;

training a classifier based on the historical vector representations and annotations; and predicting an annotation for a datacenter represented by a context graph indicating a plurality of relationships among a plurality of nodes corresponding to components of the datacenter, the context graph having a subgraph identified as a relevant region corresponding to a relevance condition not having an annotation describing the relevance condition with a textual description, wherein the classifier identifies similar subgraphs to one or more context subgraphs derived from the context graph and annotations corresponding to the similar subgraphs.

12. The method of claim 11, further comprising receiving the context graph.

13. The method of claim 12, further comprising, for the relevant region of the context graph corresponding to the relevance condition and lacking the annotation describing the relevance condition, determining a context vector representation based on selected properties.

14. The method of claim 13, further comprising comparing the context vector representation to historical vector representations to determine a set of historical vector representations that, when aggregated, are similar to the context vector representation.

15. The method of claim 14, further comprising identifying annotations corresponding to the set of historical vector representations.

16. The method of claim 15, further comprising combining the annotations in accordance with an importance that is based on a ranking function, the ranking function considering a centrality of the set of historical vector representations to the relevance condition or a frequency of a pattern in the set of historical vector representations.

17. The method of claim 16, further comprising annotating the node with the combined annotations, the combined annotations describing the relevance condition with a textual description.

18. The method of claim 17, wherein the combined annotations describe the property or the particular component that is causing the relevance condition.

19. The method of claim 11, wherein the historical datacenter corresponding to the historical metrics and the datacenter corresponding to the context graph are two different datacenters.

20. A computerized system comprising:

a processor; and a non-transitory computer storage medium storing computer-useable instructions that, when used by the processor, cause the system to:

receive a context graph indicating a plurality of relationships among a plurality of nodes corresponding to components of a datacenter, each node comprising properties corresponding to a particular component of the datacenter;

identifying one or more relevant regions from the context graph, wherein each relevant region is a portion of the context graph and is associated with the datacenter;

for each relevant region of the context graph, determining whether each relevant region identified corresponds to a relevance condition and lacks an annotation describing the relevance condition;

determine a plurality of context hashes for each relevant region based on selected properties of a node of the plurality of nodes associated with the relevant region;

compare the plurality of context hashes to a plurality of subgraph hashes derived from a library of subgraphs to determine a set of subgraph hashes that are similar to the plurality of context hashes corresponding to each relevant region;

identify annotations corresponding to the set of subgraph hashes for each relevant region; and annotate the node with one or more combined annotations, the combined annotations describing the relevance conditions of the datacenter at a particular state with a textual description.

* * * * *